United States Patent
Mochizuki

(10) Patent No.: US 9,736,354 B2
(45) Date of Patent: Aug. 15, 2017

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Toshihiro Mochizuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/019,072

(22) Filed: Feb. 9, 2016

(65) Prior Publication Data

US 2016/0241774 A1   Aug. 18, 2016

(30) Foreign Application Priority Data

Feb. 13, 2015 (JP) ................. 2015-026989

(51) Int. Cl.
*H04N 5/369* (2011.01)
*H04N 5/232* (2006.01)
*G02B 7/28* (2006.01)

(52) U.S. Cl.
CPC ..... *H04N 5/23212* (2013.01); *H04N 5/23229* (2013.01); *H04N 5/3696* (2013.01); *G02B 7/282* (2013.01)

(58) Field of Classification Search
CPC ............. H04N 5/23212; H04N 5/3696; H04N 5/23229; G02B 7/282
See application file for complete search history.

(56) References Cited

U.S. PATENT DOCUMENTS

| | | | | |
|---|---|---|---|---|
| 2012/0127297 A1* | 5/2012 | Baxi | ............. | G06T 7/0002 348/79 |
| 2013/0250164 A1* | 9/2013 | Aoki | ............. | G02B 7/34 348/348 |
| 2014/0354781 A1* | 12/2014 | Matsuyama | ....... | H04N 5/23212 348/49 |
| 2015/0181106 A1* | 6/2015 | Komori | ............. | H04N 5/23212 348/349 |

(Continued)

FOREIGN PATENT DOCUMENTS

JP   2014-074891 A   4/2014

*Primary Examiner* — Hung Lam
(74) *Attorney, Agent, or Firm* — Carter, DeLuca, Farrell & Schmidt, LLP

(57) ABSTRACT

A control apparatus includes a first processing unit configured to calculate correlation information between image signals, which are respectively output from one of the pixel portions positioned in one of a plurality of first regions, a focus detection unit configured to perform focus detection on the basis of a calculation result by the first processing unit, a second processing unit configured to calculate correlation information between image signals, which are respectively output from the one of the pixel portions positioned in one of a plurality of second regions, a distribution information calculation unit configured to calculate distribution information corresponding to an object distance on the basis of a calculation result by the second processing unit, and a control unit configured to control the second processing unit and the distribution information calculation unit on the basis of the correlation information calculated by the first processing unit.

14 Claims, 12 Drawing Sheets

(56) References Cited

U.S. PATENT DOCUMENTS

| | | | |
|---|---|---|---|
| 2015/0181196 A1* | 6/2015 | Izawa | G03B 13/18 |
| | | | 348/46 |
| 2015/0256737 A1* | 9/2015 | Saito | H04N 5/23212 |
| | | | 348/349 |
| 2016/0044230 A1* | 2/2016 | Yoshimura | H04N 5/3572 |
| | | | 348/353 |

* cited by examiner

FIG. 8A

| N(0,0) | N(1,0) | N(2,0) | N(3,0) | N(4,0) | N(5,0) | N(6,0) |
| --- | --- | --- | --- | --- | --- | --- |
| N(0,1) | N(1,1) | N(2,1) | N(3,1) | N(4,1) | N(5,1) | N(6,1) |
| N(0,2) | N(1,2) | N(2,2) | N(3,2) | N(4,2) | N(5,2) | N(6,2) |
| N(0,3) | N(1,3) | N(2,3) | N(3,3) | N(4,3) | N(5,3) | N(6,3) |
| N(0,4) | N(1,4) | N(2,4) | N(3,4) | N(4,4) | N(5,4) | N(6,4) |

FIG. 8B

| R(0,0) | R(1,0) | R(2,0) | R(3,0) | R(4,0) | R(5,0) | R(6,0) |
| --- | --- | --- | --- | --- | --- | --- |
| R(0,1) | R(1,1) | R(2,1) | R(3,1) | R(4,1) | R(5,1) | R(6,1) |
| R(0,2) | R(1,2) | R(2,2) | R(3,2) | R(4,2) | R(5,2) | R(6,2) |
| R(0,3) | R(1,3) | R(2,3) | R(3,3) | R(4,3) | R(5,3) | R(6,3) |
| R(0,4) | R(1,4) | R(2,4) | R(3,4) | R(4,4) | R(5,4) | R(6,4) |

FIG. 8C

| Afd(1,1) | | Afd(3,1) | | | Afd(5,1) | |
| --- | --- | --- | --- | --- | --- | --- |
| | Afd(2,2) | Afd(3,2) | Afd(4,2) | | | |
| Afd(1,3) | | Afd(3,3) | | | Afd(5,3) | |

FIG. 8D

| Defs(0,0) | Defs(1,0) | Defs(2,0) | Defs(3,0) | Defs(4,0) | Defs(5,0) | Defs(6,0) |
| --- | --- | --- | --- | --- | --- | --- |
| Defs(0,1) | Defs(1,1) | Defs(2,1) | Defs(3,1) | Defs(4,1) | Defs(5,1) | Defs(6,1) |
| Defs(0,2) | Defs(1,2) | Defs(2,2) | Defs(3,2) | Defs(4,2) | Defs(5,2) | Defs(6,2) |
| Defs(0,3) | Defs(1,3) | Defs(2,3) | Defs(3,3) | Defs(4,3) | Defs(5,3) | Defs(6,3) |
| Defs(0,4) | Defs(1,4) | Defs(2,4) | Defs(3,4) | Defs(4,4) | Defs(5,4) | Defs(6,4) |

| S | | S | | S | |
|---|---|---|---|---|---|
| S-1 | | S-1 | | S-1 | |
| S-2 | | S-2 | | S-2 | |
| ... | Afd(1,1) | ... | Afd(2,2) | ... | Afd(1,3) |
| -S+2 | | -S+2 | | -S+2 | |
| -S+1 | | -S+1 | | -S+1 | |
| -S | | -S | | -S | |
| S | | S | | S | |
| S-1 | | S-1 | | S-1 | |
| S-2 | | S-2 | | S-2 | |
| ... | Afd(3,1) | ... | Afd(3,2) | ... | Afd(3,3) |
| -S+2 | | -S+2 | | -S+2 | |
| -S+1 | | -S+1 | | -S+1 | |
| -S | | -S | | -S | |
| S | | S | | S | |
| S-1 | | S-1 | | S-1 | |
| S-2 | | S-2 | | S-2 | |
| ... | Afd(5,1) | ... | Afd(4,2) | ... | Afd(5,3) |
| -S+2 | | -S+2 | | -S+2 | |
| -S+1 | | -S+1 | | -S+1 | |
| -S | | -S | | -S | |

FIG. 9A　　　　FIG. 9B　　　　FIG. 9C

CONTROL APPARATUS, IMAGE PICKUP APPARATUS, CONTROL METHOD, AND STORAGE MEDIUM

BACKGROUND OF THE INVENTION

Field of the Invention

This invention relates to an image pickup apparatus, its control apparatus, and its control method.

Description of the Related Art

In some image pickup apparatuses such as a digital camera and a digital video camera, pixels of the whole or apart of an image sensor have distance measuring function. Such image pickup apparatus includes a plurality of photoelectric conversion portions for each pixel, and detects a distance to an object by a phase-difference method. For example, Japanese Patent Laid-Open No. 2014-74891 describes an image pickup apparatus that generates an image and distance distribution corresponding to the image (hereinafter referred to as "distance map") using the above mentioned technique.

Generating a distance map, however, requires a correlation calculation of a focus detection signal obtained from each photoelectric conversion portion for each pixel, and therefore the calculation load on a calculation circuit increases. It has a problem that processing of a calculation circuit is delayed, etc.

SUMMARY OF THE INVENTION

This invention provides an image pickup apparatus capable of reducing the load on a calculation circuit when generating a distance map, its control apparatus, and its control method.

A control apparatus, which is used for an image pickup apparatus including an image sensor that has a plurality of pixel portions respectively having a plurality of photoelectric conversion portions and outputs an image signal from the photoelectric conversion portions, as one aspect of the present invention includes a first processing unit configured to calculate correlation information between image signals, which are respectively output from one of the pixel portions positioned in one of a plurality of first regions, a focus detection unit configured to perform focus detection on the basis of a calculation result by the first processing unit, a second processing unit configured to calculate correlation information between image signals, which are respectively output from the one of the pixel portions positioned in one of a plurality of second regions, wherein the one of the second regions includes a region near the one of the first regions, is larger than the one of the first regions, and corresponds to the one of the first regions, a distribution information calculation unit configured to calculate distribution information corresponding to an object distance on the basis of a calculation result by the second processing unit, and a control unit configured to control the second processing unit and the distribution information calculation unit on the basis of the correlation information calculated by the first processing unit.

Further features and aspects of the present invention will become apparent from the following description of exemplary embodiments with reference to the attached drawings.

BRIEF DESCRIPTION OF THE DRAWINGS

FIG. 8A to 8D are diagrams that illustrate an image data arrangement, a focus detection area, and a distance map area.

FIG. 9A to 9C are diagrams that illustrate the structure of correlation data in a focus detection area in this embodiment.

DESCRIPTION OF THE EMBODIMENTS

Figure 1:
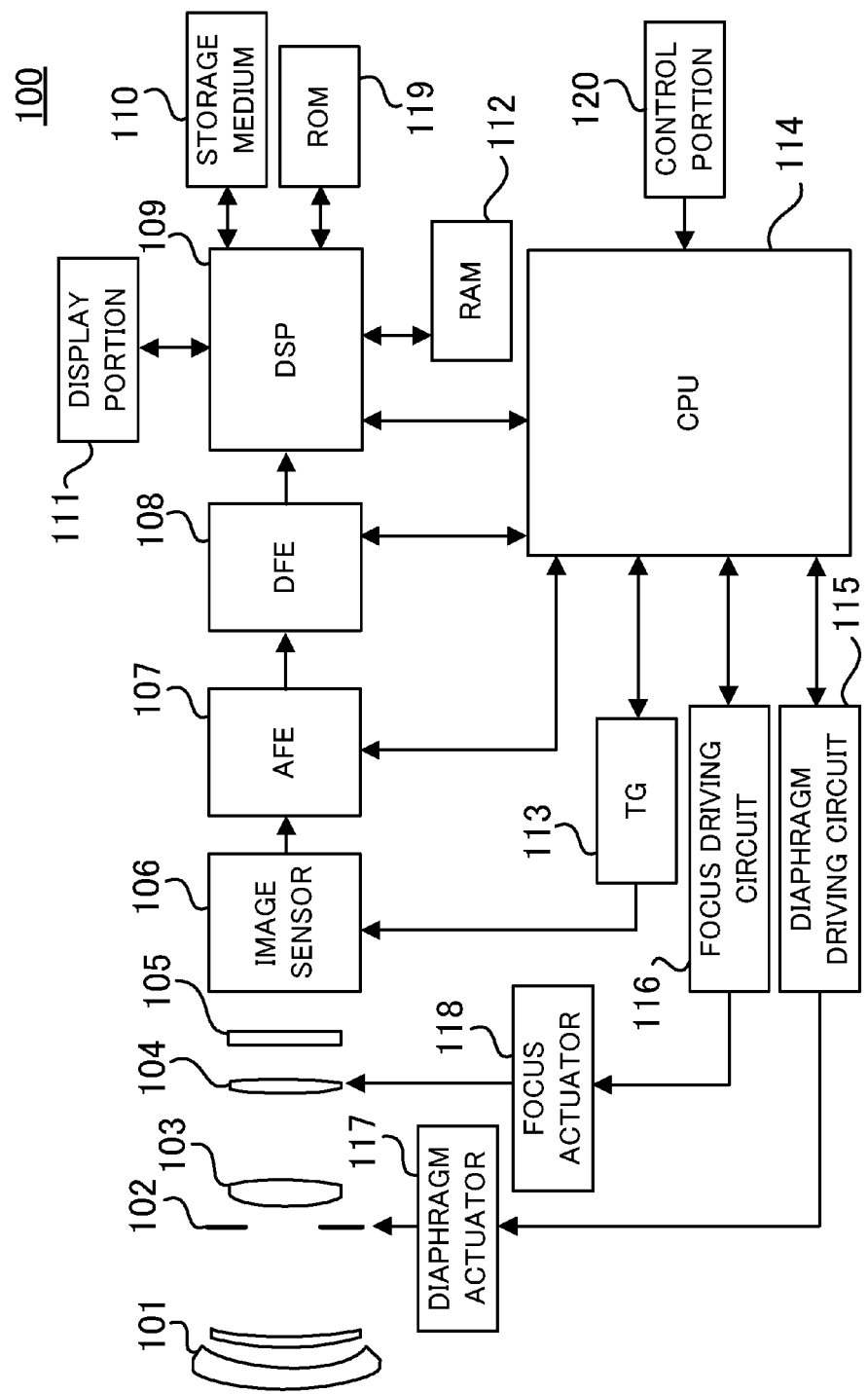
FIG. 1 is a block diagram of an image pickup apparatus in this embodiment.

Exemplary embodiments of the present invention will be described below with reference to the attached drawings. FIG. 1 is a diagram illustrating the whole structure of an image pickup apparatus 100 in this embodiment.

A first lens unit 101 configures an image pickup optical system, and is arranged at a front end part of a lens barrel (object side) and is held to be capable of being advanced and retreated along an optical axis direction. A diaphragm 102 adjusts a light amount in photographing by adjusting its aperture diameter. A second lens unit 103 varies the magnification (zoom function) along with the advance and retreat operation of the first lens unit 101. A third lens unit 104 is a focusing lens (focus lens), and performs a focusing by advance and retreat in the optical axis direction. An optical low pass filter 105 is an optical element for reducing false color or moire of taken images.

An image sensor 106 performs a photoelectric conversion of an object image formed by an image pickup optical system. In this embodiment, the image sensor 106 utilizes a CMOS image sensor having Bayer arrangement. Each pixel in the image sensor 106 includes a plurality of photoelectric conversion portions. Specifically, a plurality of photodiodes (hereinafter simply referred to as "PD") is disposed in a pixel. The number of PD in a pixel portion is two or more (two, four, nine, etc.), and in this embodiment two PDs form sub pixel a and sub pixel b. A signal used for focus detection (focus detection signal) and a signal used for image generation (image generation signal) are obtained from the sub pixels.

AFE (Analog Front End) 107 converts, to digital signal, analog signal outputted from the image sensor 106. DFE (Digital Front End) 108 performs calculation processing as preprocessing to the digital image signal outputted from the AFE 107. DSP (Digital Signal Processor) 109 performs correction processing, developing processing, or the like for the digital image signal outputted from the DFE 108.

A storage medium 110 stores image data processed by the DSP109. A display portion 111 is configured from a liquid crystal display (LCD) displaying a taken image, a various menu screen, etc., or the like. RAM (Random Access Memory) 112 is a device that temporarily stores image data etc., and is connected with the DSP 109. A timing generator (TG) 113 supplies a driving signal to the image sensor 106.

CPU (Central Processing Unit) 114 controls the AFE107, the DFE108, the DSP109, the TG113, the diaphragm, and a driving circuit 115. Furthermore, CPU 114 performs an AF (autofocus) control. Specifically, the CPU 114 calculates a defocus amount from a correlation calculation result calculated by the DSP 109, and controls a focus driving circuit 116 according to the defocus amount. The focus driving circuit 116 is a circuit that drives a focus actuator 118. The focus actuator 118 advances and retreats the third lens unit 104, thereby performing focusing. A diaphragm driving circuit 115 controls a diaphragm actuator 117 according to the control instruction of the CPU 114, thereby driving the diaphragm 102. ROM (Read Only Memory) 119 stores correction data or the like. A control portion 120 includes a shutter switch button (SW). A user performs an operation such as half pressing and full pressing to the shutter switch button, and an instruction signal is input to the CPU 114. Moreover, the control portion 120 includes a dial, a touch panel, etc., and enables a various operation in shooting modes, setting of various shooting parameters, reproducing modes, menu screens, or the like.

Figure 2:
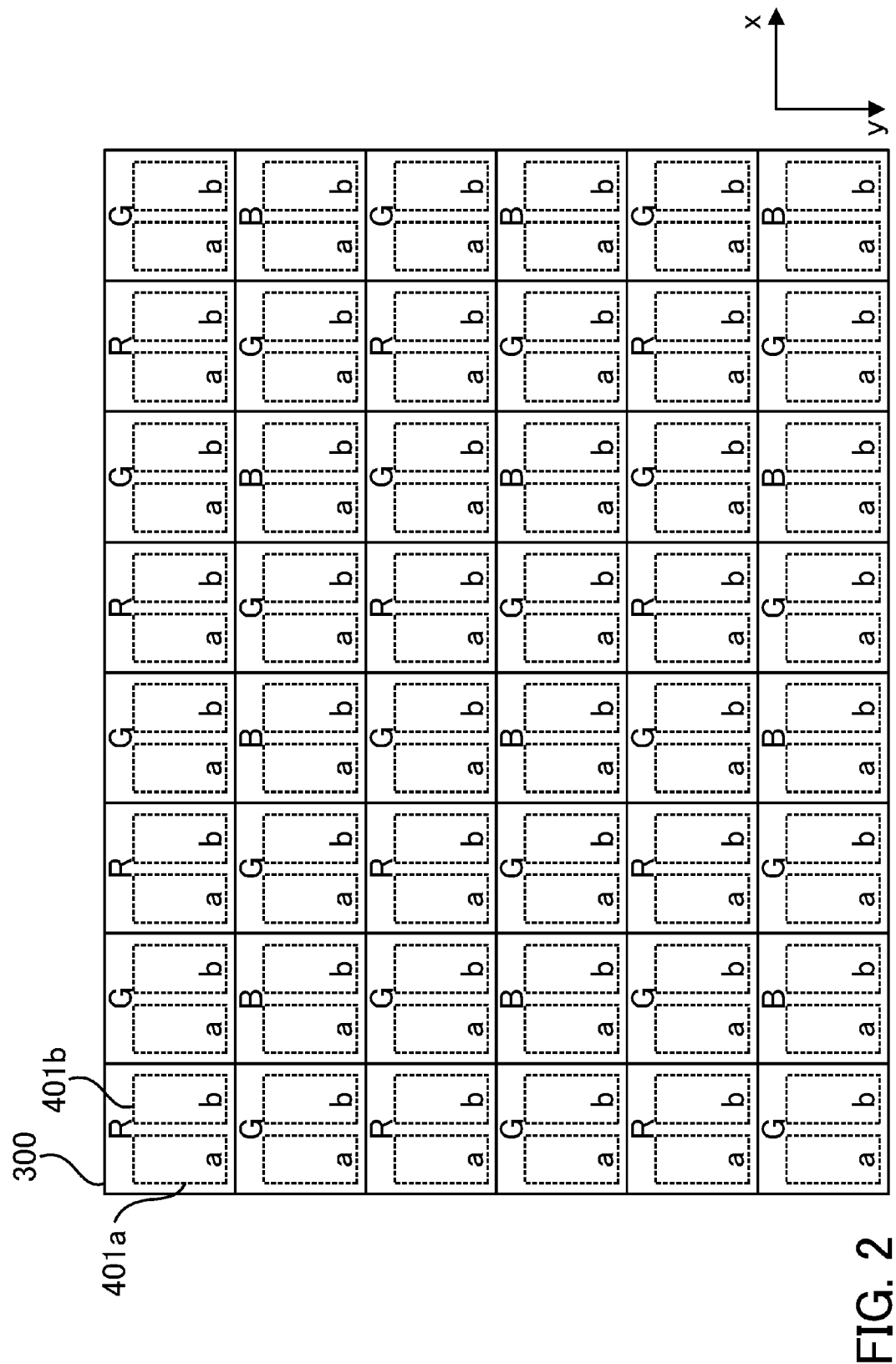
FIG. 2 is a pixel layout diagram of an image sensor in this embodiment.

FIG. 2 is a schematic diagram that illustrates a pixel layout example of the image sensor 106. A unit pixel portion 300 is arranged in matrix, and color filters of R (Red)/G (Green)/B (Blue) in unit pixel portion 300 are arranged in Bayer array. The sub pixel a and sub pixel b are arranged in each unit pixel portion 300. In FIG. 2, PD 401a is a first photoelectric conversion portion that forms the sub pixel a, and PD 401b is a second photoelectric conversion portion that forms the sub pixel b. Each signal from the sub pixel a and the sub pixel b is also utilized for focus detection or distance information to an object.

Figure 3:
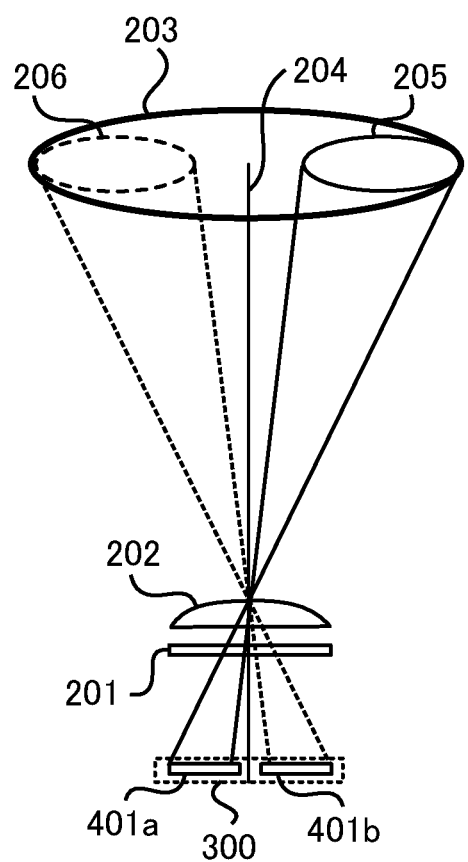
FIG. 3 is a diagram that illustrates the relationship of an imaging lens and a unit pixel portion in this embodiment.

FIG. 3 is a diagram that illustrates the relationship between the unit pixel portion 300 and light flux emitted from an exit pupil 203 of an imaging lens composed of the first lens unit 101, the diaphragm 102, the second lens unit 103, and the third lens unit 104. As described above, the unit pixel portion 300 includes PD 401a and PD 401b. A color filter 201 and a microlens 202 are arranged between the unit pixel portion 300 and the exit pupil 203.

An optical axis 204 indicates the center of light flux emitted from the exit pupil 203 toward a pixel portion having the microlens 202. Light that passes the exit pupil 203 enters the unit pixel portion 300 with the optical axis 204 as a center. Each of areas 205 and 206 represents a part area of the exit pupil 203 of the imaging lens. As illustrated in FIG. 3, light flux that has passed the area 205 passes through the microlens 202 and is received on the PD 401a (sub pixel a). Light flux that has passed the area 206 passes through the microlens 202 and is received on the PD 401b (sub pixel b). In other words, each of the sub pixel a and the sub pixel b receives light that has passed different area of the exit pupil 203 of the imaging lens. Comparing output signals from the sub pixel a and the sub pixel b enables focus detection by the phase-difference method.

When a state is out of the in-focus state, image signal waveforms respectively obtained from sub pixels a, b are greatly shifted. As it approaches the in-focus state, the shift between the image signal waveforms decreases. In the in-focus state, both waveforms overlap with each other. By utilizing such a phenomenon, the defocus amount can be detected based on the shift amount of each image signal waveform obtained from the sub pixels a, b.

Figure 4:
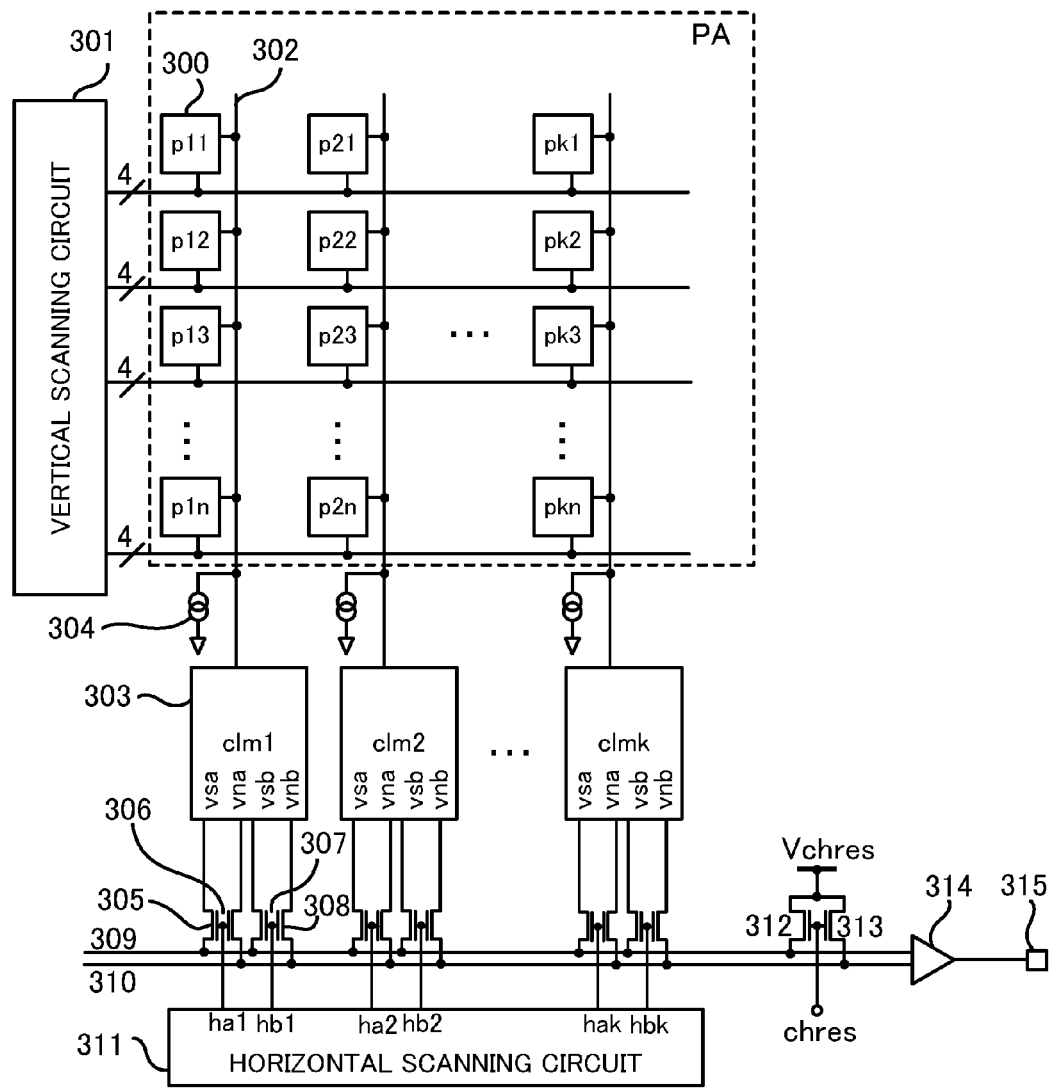
FIG. 4 is a schematic diagram of the whole structure of an image sensor in this embodiment.
Figure 5:
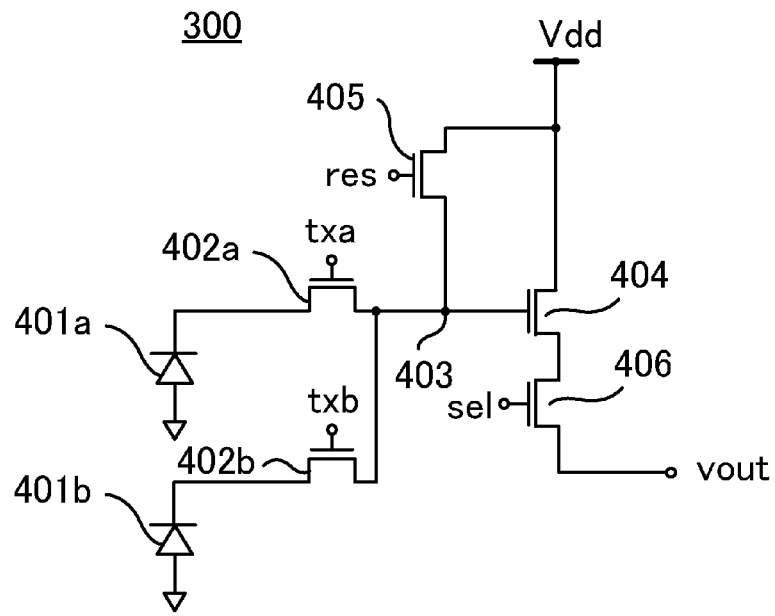
FIG. 5 is a diagram that illustrates the structure of a unit pixel portion in this embodiment.
Figure 6:
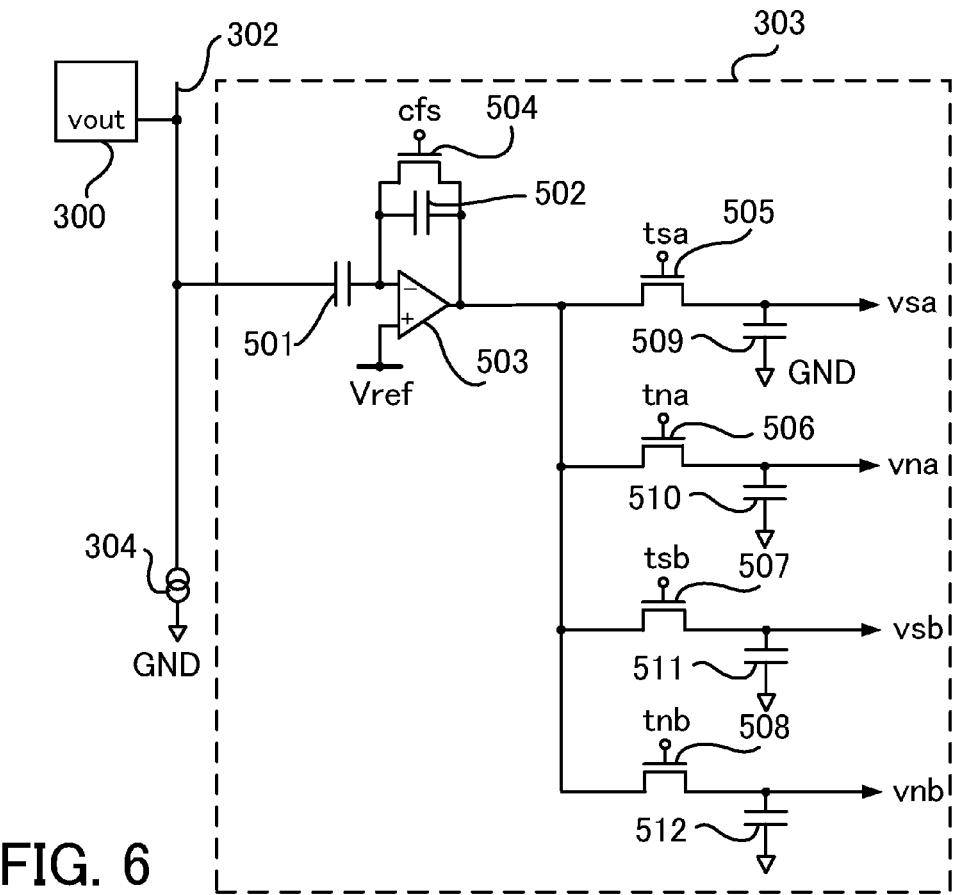
FIG. 6 is a diagram that illustrates the structure of a column common readout circuit in this embodiment.

Next, the structure of the image sensor 106 will be described with reference to FIGS. 4 to 6. FIG. 4 is a diagram that illustrates the whole structure of the image sensor 106. FIG. 5 is a circuit diagram that illustrates the structure of the unit pixel portion 300. FIG. 6 is a circuit diagram that illustrates the structure of the column common readout circuit 303.

Many unit pixel portions 300 (see p11~pkn) are arranged in matrix in a pixel area illustrated in FIG. 4.

The PDs 401a, 401b perform the photoelectric conversion of incident light, and accumulate charge according to exposure amount. Transfer gates 402a, 402b turn the ON state by setting respective signals txa, txb of the transfer gates 402a, 402b to High level. As a result, charge accumulated in PDs 401a, 401b is transferred to an FD (floating diffusion) part 403. The FD part 403 is connected to a gate floating diffusion amplifier 404 (hereinafter referred to as "FD amplifier"). An FD amplifier 404 converts change amount, transferred from the PDs 401a, 401b, into voltage amount. An FD reset switch 405 resets the FD part 403 by setting a signal res to High level. When charge in PDs 401a, 401b is reset, the signal res and the signals txa, txb are simultaneously set to High level. When the transfer gates 402a and 402b and the FD reset switch 405 turn the ON state, the PDs 401a, 401b is reset via the FD part 403. A pixel select switch 406 changes signal sel to High level, and a pixel signal converted into a voltage by the FD amplifier 404 is output from an output terminal vout of the unit pixel portion 300.

A vertical scanning circuit 301 in FIG. 4 supplies gate control signal (res, txa, txb, sel) to a transistor of the unit pixel portion 300. The control for the signals is common in each row. The output terminal vout of each unit pixel portion 300 is connected to the column common readout circuit 303 via a vertical output line 302 in each column. The structure of the column common readout circuit 303 will be described below with reference to FIG. 5.

The vertical output line 302 is set in each column, and is connected to the output terminal vout of the unit pixel portions 300 in one column. To the vertical output line 302, a current source 304 is connected. This current source 304 and the FD amplifier 404 of the unit pixel portion 300 connected to the vertical output line 302 constitute a source follower circuit.

A clamp capacitance (C1) 501 is connected to an inverted input terminal of a calculation amplifier 503. A clamp capacitance (C2) 502 is connected to an output terminal and an inverted input terminal of the calculation amplifier 503. To the non-inverted input terminal of the calculation amplifier 503, a reference power Vref is connected. A switch 504 is a transistor for causing short circuit between both terminals of a feedback capacitance C2, and is controlled by a signal cfs. Each of transfer switches 505 to 508 is a transistor for transferring a signal readout from the unit pixel portion 300 to each of signal holding capacitors 509 to 512. By a readout operation described below, a pixel signal Sa of a sub pixel a is memorized in a first S signal holding capacitor 509, and the addition signal Sab obtained by adding a signal of a sub pixel a and a signal of a sub pixel b is memorized in a second S signal holding capacitor 511. Moreover, noise signals N of the unit pixel portion 300 are stored in a first N signal holding capacitor 510 and a second N signal holding capacitor 512. The signal holding capacitors 509 to 512 are respectively connected to output terminals vsa, vna, vsb, vnb of the column common readout circuit 303.

The output terminals vsa, vna of the column common readout circuit 303 in FIG. 4 are respectively connected to the horizontal transfer switches 305, 306. The horizontal transfer switches 305, 306 are controlled by an output signal ha* (* denotes arbitrary column number) of a horizontal scanning circuit 311. If the signal ha* is set to High level, signals in the first S signal holding capacitor 509 and the first N signal holding capacitor 510 are respectively transferred to the horizontal output lines 309, 310.

Moreover, horizontal transfer switches 307, 308 are respectively connected to the output terminals vsb, vnb of the column common readout circuit 303. The horizontal transfer switches 307, 308 are controlled by an output signal hb* (* denotes arbitrary column number) of the horizontal scanning circuit 311. If the signal hb* is set to High level, signals in the second S signal holding capacitor 511 and the second N signal holding capacitor 512 are respectively transferred to the horizontal output lines 309, 310.

The horizontal output lines 309, 310 is respectively connected to input terminals of differential amplifier 314. The differential amplifier 314 calculates the difference of an S signal and an N signal, applies a predetermined gain to it, and then outputs its final output signal to an output terminal 315. Horizontal output line reset switches 312, 313 turn the ON state by setting a signal chres to High level, and each of the horizontal output lines 309, 310 is set to a reset voltage Vchres (reset).

Next, functional blocks of the DSP109 in this embodiment will be described with reference to FIGS. 7 to 9.

The image data corresponding to the sub pixel a, obtained from the group of unit pixel portions 300, denotes L(X,Y) and the image data corresponding to the sub pixel b denotes R(X, Y) (X, Y are an integer number more than 0, and indicate the coordinates of a pixel position). In this case, a/b addition signal data (hereinafter simply referred to as "addition data") N (X, Y) is represented by the following expression:

$$N(X,Y)=L(X,Y)+R(X,Y) \quad (1)$$

In other words, the addition data N (X, Y) is also image data corresponding to each group of unit pixel portions 300.

In embodiment, the image sensor 106 outputs R(X,Y) and N(X, Y) as one set. In addition, a set of image data output from the image sensor 106 may be a set of other data. For example, a set of L(X, Y) and N(X, Y) or a set of R(X, Y) and L(X, Y) is output.

The addition data N (X, Y) and the image data R(X, Y) output from the image sensor 106 are input to the DSP 109 through the AFE 107 and the DFE 108.

FIG. 8A illustrates the addition data N (X, Y) and FIG. 8B illustrates the image data R (X, Y). In this embodiment, as illustrated as FIGS. 8A and 8B, each data is divided into seven parts in a horizontal direction and five parts in a vertical direction. The division number is not limited to this.

Figure 7:
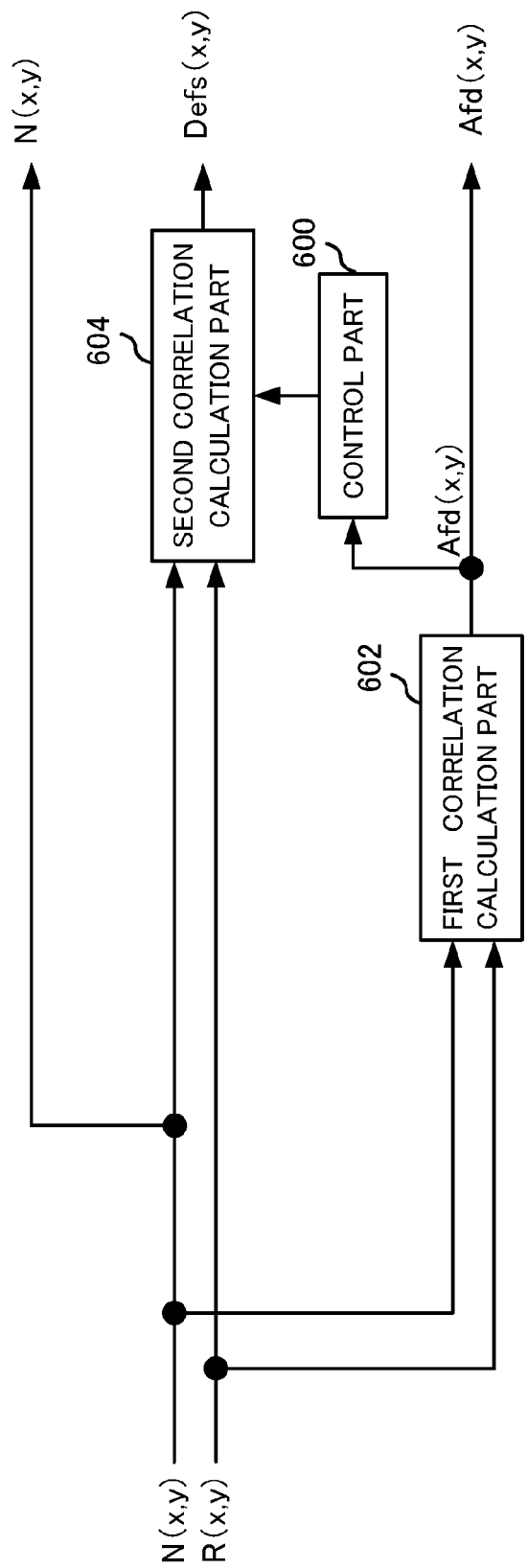
FIG. 7 is a function block diagram of DSP in this embodiment.

As illustrated as FIG. 7, the addition data N (X, Y) and the image data R (X, Y) are input to a first correlation calculation part 602 and a second correlation calculation part 604. Moreover, the addition data N (X, Y) processed by signal processing and compression using a white balance circuit, a color interpolation circuit, noise reduction processing, gamma processing, matrix processing, degeneration processing, which are known, is output to the display portion 111 and storage medium 110.

The first correlation calculation part 602 calculates the image data L (X, Y) by subtracting the image data R (X, Y) from the addition data N (X, Y) in a focus detection region (first region) set by the CPU 114. The first correlation calculation part 602 calculates correlation data Afd (X, Y) (correlation information) of the calculated image data L (X, Y) and the image data R (X, Y) in a region set by the CPU114 on the basis of the calculated image data L (X, Y) and the image data R (X, Y) using the following method. In this embodiment, the CPU 114 selects at least a part of data as illustrated as FIG. 8C and sets a focus detection region in which correlation data Afd (X, Y) is calculated. For example, when a user sets an AF control with respect to a center of data through the control portion 120, the CPU 114 sets a region obtained correlation data Afd (3, 2) of FIG. 8C as a focus detection region and performs correlation calculation using only signal in the region. However, when a mode that generates distance distribution information is set as a shooting mode, correlation calculation of a plurality of focus detection regions is performed so as to obtain a plurality of distribution information regardless of a set AF mode (set of a focus detection region).

The first correlation calculation part 602 calculates correlation data Afd (X, Y) by comparing signal waveforms of the image data L (X, Y) and the image data R (X, Y) while both data are shifted in a horizontal direction. Here, when a shift amount is set to a minus when the image data L (X, Y) is shifted to the left and to a plus when the image data R (X, Y) is shifted to the right, shift movement from −S to S is performed.

The first correlation calculation part 602 compares signal waveforms of both image data in a horizontal direction for each shift movement. Specifically, the first correlation calculation part 602 calculates a value added one line value of the smaller of the image data L (X, Y) and the image data R (X, Y) in each position as an one line correlation value for each shift amount. And, a correlation value of the same focus detection region for each shift amount is derived by adding an one line correlation value of each line in the same focus detection region for each shift amount and is input to a control part 600 as correlation data Afd (X, Y). A correlation value in each focus detection region becomes maximum during being a shift amount that signal waveforms of the image data L (X, Y) and the image data R (X, Y) overlap (approach). A calculation method of correlation data is not limited to this, and may be a calculation method indicating correlation of the image data L (X, Y) and the image data R (X, Y).

FIG. 9A to 9C are diagrams that illustrate the structure of correlation data Afd (X, Y) input to the control part 600. The controller 600 stores a correlation value of each shift amount (−S to S) calculated by the first correlation calculation part 602 in the RAM 112 for each Afd (X, Y). RAM 112 stores at least two frame correlation data. Correlation data of the control part 600 and two frame correlation data are compared, and a calculation operation by the second correlation calculation part 604 is controlled on the basis of the comparison result using the following method.

The second correlation calculation part 604 calculates the image data L (X, Y) by subtracting the image data R (X, Y) from the addition data N (X, Y) as the first correlation calculation part 602. The second correlation calculation part 604 calculates correlation data Defs (X, Y) in a region set by the CPU114 on the basis of the calculated image data L (X, Y) and the image data R (X, Y) using the same calculation method that the second correlation calculation part 604 calculates correlation data Afd (X, Y). In this embodiment, the CPU 114 sets a distance map region in which correlation data Defs (X, Y) is calculated as illustrated as FIG. 8D. The distance map region is a region in which the CPU114 actually calculates a distance map on the basis of correlation data. In this embodiment, the distance map is the entire region of image data but is not limited to this. When a focus detection region is narrower than the distance map, a load of calculation processing can be reduced. Specifically, when the second correlation calculation part 604 stops or performs calculation processing of correlation data Defs (X, Y) according to instructions from the control part 600, a load of calculation processing can be reduced. The second correlation calculation part 604 may stop calculation processing of the image data L (X, Y) according to instructions from the control part 600.

Correlation data Defs (X, Y), which is calculated by the second correlation calculation part 604 processed by signal processing and compression using a white balance circuit, a color interpolation circuit, noise reduction processing, gamma processing, matrix processing, degeneration processing, which are known, is stored as distance map (object distance distribution) including distance information to an object in the storage medium 110. Moreover, the second correlation calculation part 604 may calculate a defocus amount and the CPU 114 (distance calculation part) may calculate a defocus amount from correlation data Defs (X, Y). Additionally, the calculated correlation data Defs (X, Y) (image shift amount) and the calculated defocus amount may be directly stored as distance map in the storage medium 110. In other words, in this embodiment, information indicating distribution of information corresponding to an object distance (a distance to a depth direction in the image data) may be obtained, and the obtainment method of the information is not limited to the above method.

Next, a control of the DSP 109 by the CPU 114 according to this embodiment will be explained referring to flowcharts in FIGS. 10A and 10B.

Figure 10A:
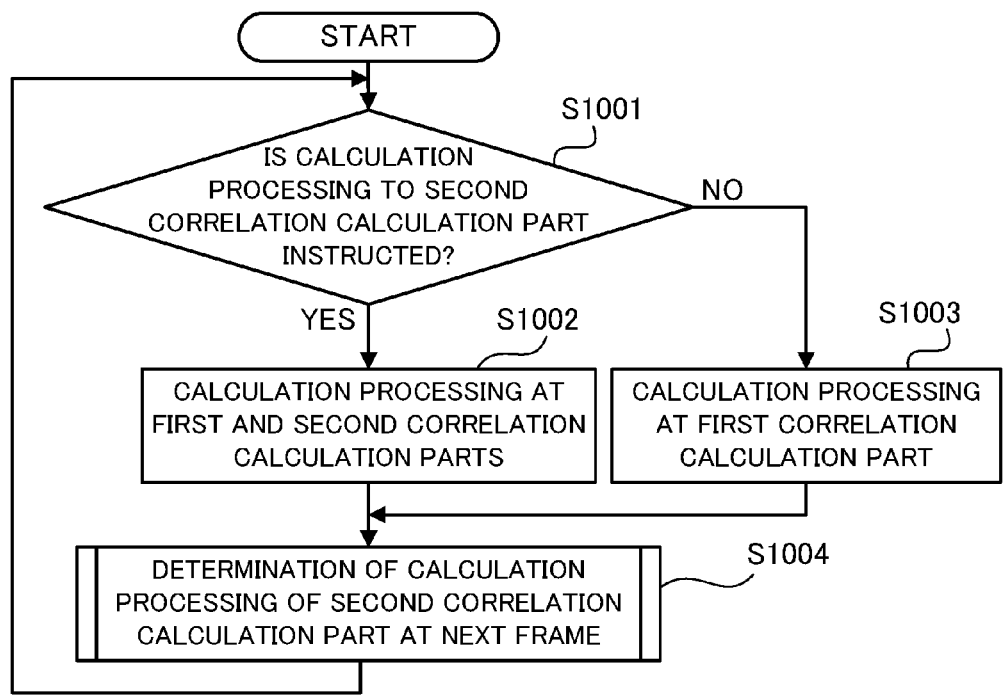
FIGS. 10A and 10B are flowcharts of a control in this embodiment.
Figure 10B:
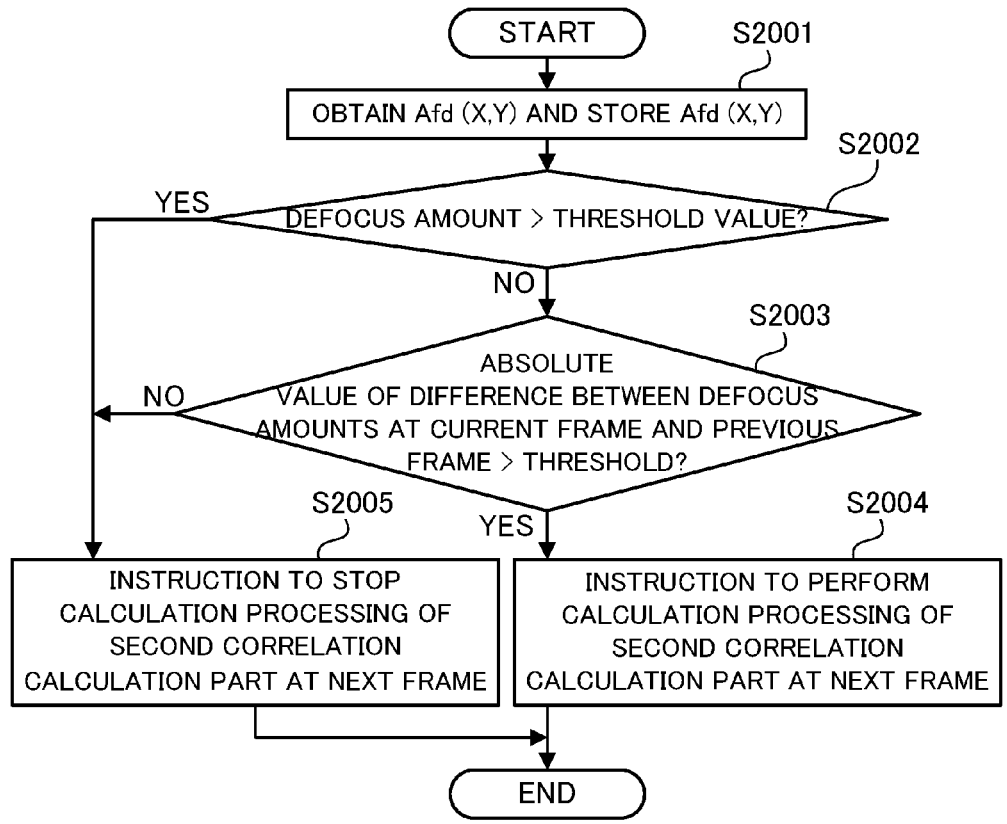

FIG. 10A illustrates a main control performed in the DSP 109. The control in FIG. 10A is performed not only in a shooting mode, in which a still image and or a moving image is just captured and stored but also in a shooting mode, in which a moving image is captured and stored, and object distribution information is generated. Obtaining the image data L (X, Y) and R (X, Y) and calculating distribution information using a correlation calculation with respect to the entire screen always obtain distribution information corresponding to one object distance relative to each frame (or a plurality of frames), but the calculation has a high load and largely occupies a band of a bus. In this embodiment, a calculation of distribution information in each region (second region) in a screen is controlled on the basis of a result of correlation calculation for AF calculated in a focus detection region. Thus, an unnecessary update of distribution information decreases and a load of a calculation reduces.

At step S1001, the DSP 109 determines whether or not calculation processing to the second correlation calculation part 604 is instructed. The flow proceeds to step S1002 when calculation processing is instructed, and the flow proceeds to step S1003 when calculation processing is not instructed.

At the step S1002, the DSP 109 performs the correlation processing at the first correlation calculation part 602 and the second correlation calculation part 604 using the addition data N (X, Y) and the image data (X, Y). Meanwhile, at the step S1003, the DSP 109 performs the correlation processing only at the first correlation calculation part 602 using the addition data N (X, Y) and the image data (X, Y) and stops the correlation processing at the second correlation calculation part 604.

At step S1004, the DSP 109 (control part 600) determines whether or not the calculation processing of the second correlation calculation part 604 at a next frame is performed. A branch selected at the step S1001 is changed according the determination at this step.

Next, specific processing performed by the control part 600 will be explained referring to FIG. 10B.

At step S2001, the control part 600 obtains correlation data Afd (X, Y) from the first correlation calculation part 602 and stores it to the RAM 112. At step S2002, the control part 600 determines whether a defocus amount is larger than a threshold value set by the CPU 114 in all focus detection region on the basis of the correlation data Afd (X, Y). The flow proceeds to step S2003 when the defocus amount is smaller than the threshold value in all focus detection region, and the flow proceeds to step S2005 when the defocus amount is larger than the threshold value in all focus detection region. The threshold value is set by the CPU 114.

At Step S2003, the control part 600 reads out correlation data Afd (X, Y) of a current frame (present) at the step S2001 and correlation data Afd of a previous frame (past) from the RAM 112 to compare them. Specifically, comparison data Comp (X, Y) being an absolute value of differences between defocus amounts at both frames is obtained from the Afd (X, Y) of the current frame, and it is determined whether or not the comparison data is larger than a threshold value in all focus detection region. The flow proceeds to step S2004 when the comparison data is larger than the threshold value in all focus detection region, and the flow proceeds to step S2005 when the comparison data is smaller than (or is equal to) the threshold value in all focus detection region. The threshold value is set by the CPU 114. Moreover, the comparison data Comp (X, Y) may be a comparison result between the absolute value of differences between defocus amounts and the threshold value.

At Step S2004, the control part 600 instructs the second correlation calculation part 604 to perform correlation processing at next frame, and ends the processing at the current frame.

At Step S2005, the control part 600 instructs the second correlation calculation part 604 to stop correlation processing at next frame, and ends the processing at the current frame.

According to the determination at the step S2002, when image blur obtained from the image sensor 106 is large, stopping calculation processing of correlation data Defs (X, Y) reduces a load of the calculation circuit. Additionally, according to the determination at the step S2003, when variation of a defocus amount of an image obtained from the image sensor 106, stopping calculation processing of correlation data Defs (X, Y) reduces a load of the calculation circuit.

Figure 11A:
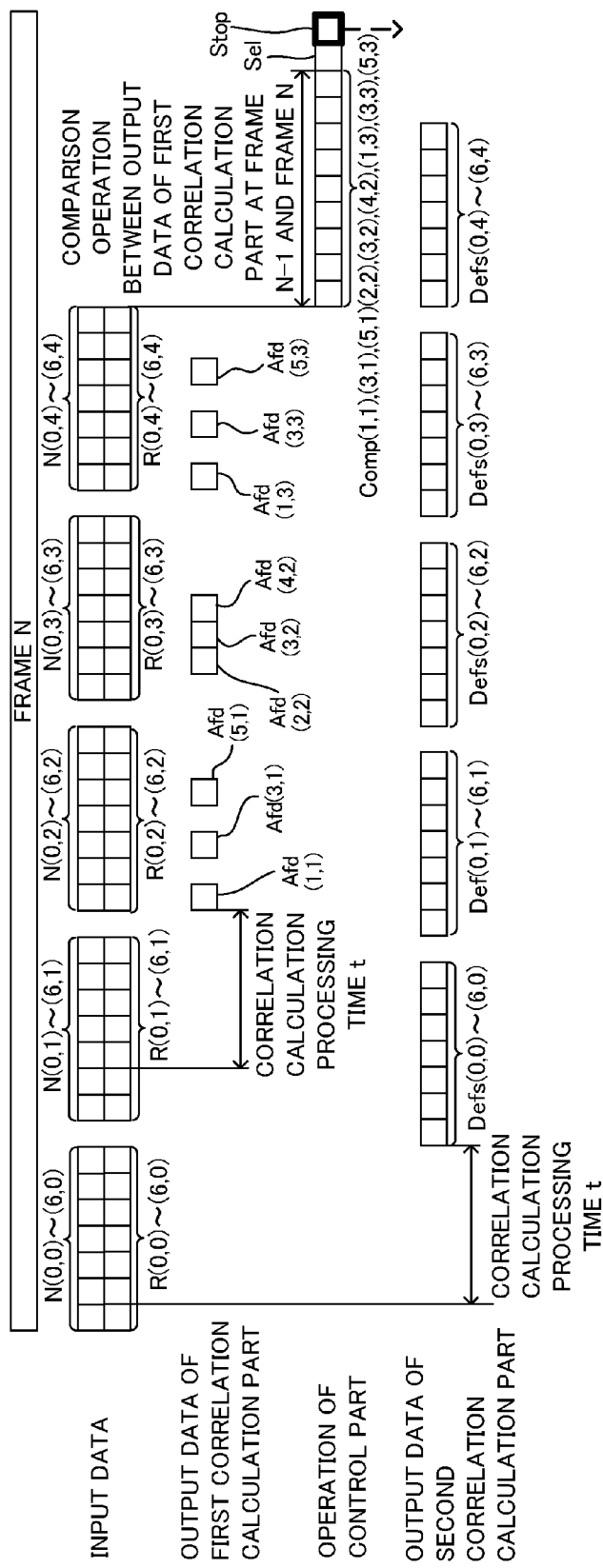
FIG. 11A is a diagram for explaining calculation processing of N frame in this embodiment.
Figure 11B:
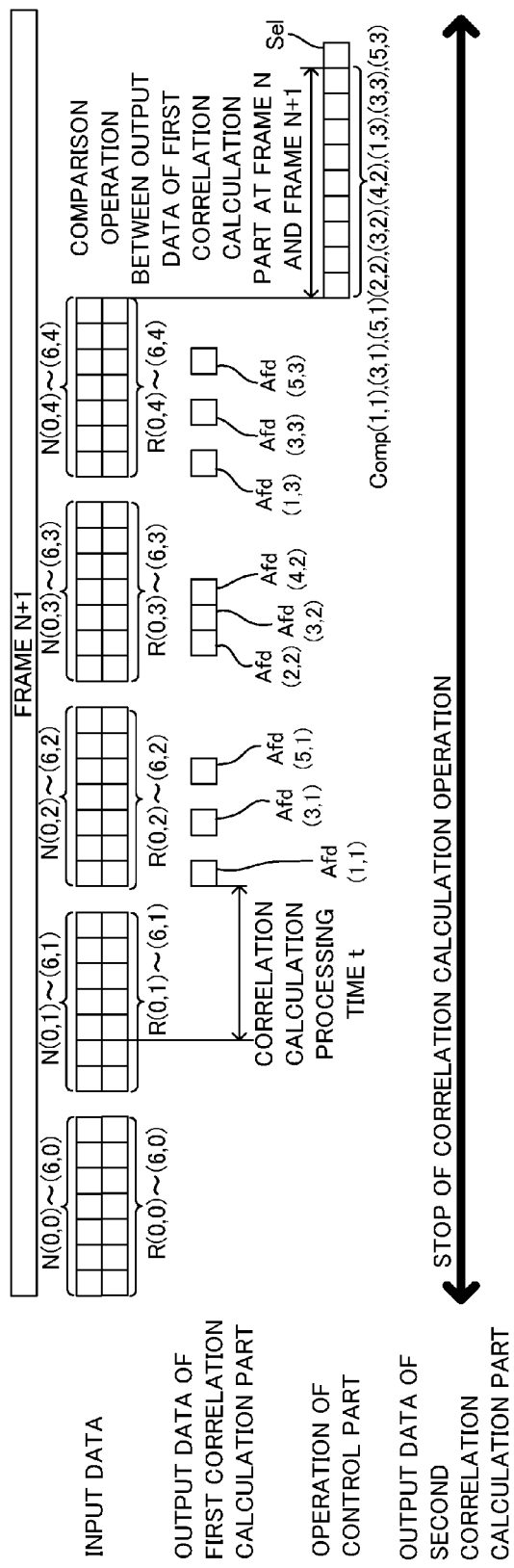
FIG. 11B is a diagram for explaining calculation processing of N+1 frame in this embodiment.
Figure 11C:
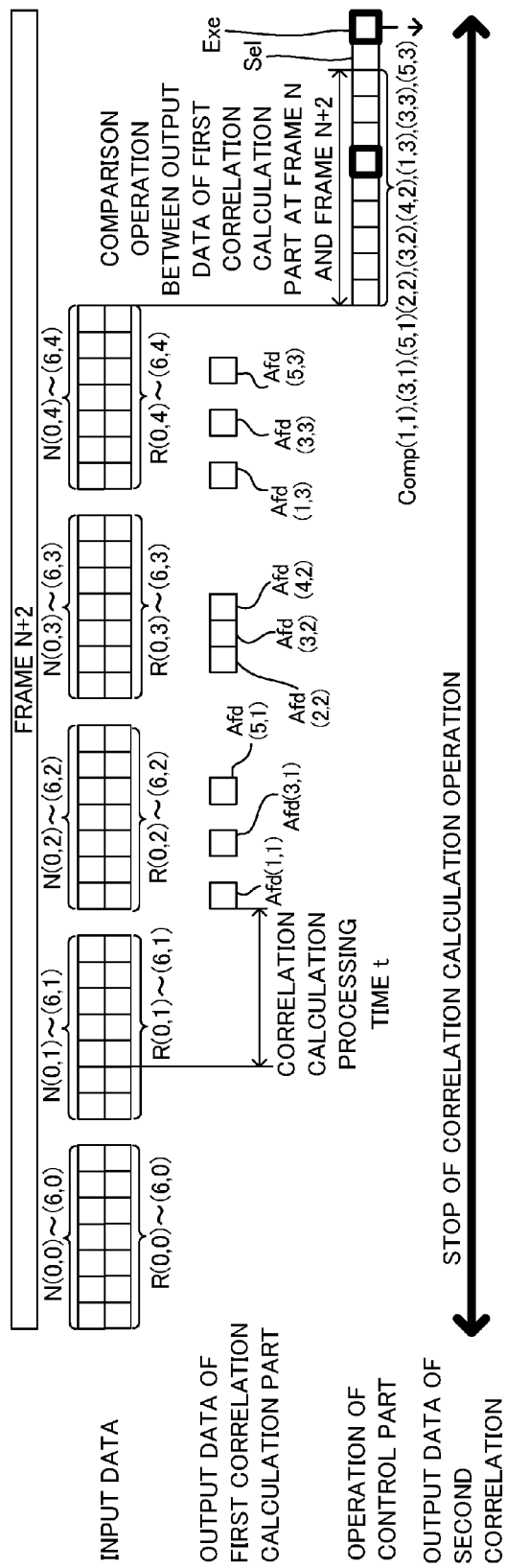
FIG. 11C is a diagram for explaining calculation processing of N+2 frame in this embodiment.

Next, processing of the DSP 109 during capturing a moving image after correcting image blur to a certain extent corresponding to steps from the step S1005 to the step S1008 will be specifically explained referring to FIGS. 11A, 11B, and 11C. FIGS. 11A to 11C illustrate an operation of the DSP 109 during capturing a moving image. Frames N to N+2 respectively represent a frame number of a moving image, and FIGS. 11A to 11C respectively illustrate processing at the N frame to the N+2 frame. Under the frame number, input numbers input to the DSP 109 from the DFE 108 and correlation data Afd (X, Y) output from the first correlation calculation part 602 are represented. Further, under them, comparison data Comp (X, Y) obtained by the control part 600 and correlation data Defs (X, Y) output from the correlation calculation part 604 are represented. Moreover, in the following descriptions, the control part 600 previously includes correlation data Afd (X, Y) of each shift amount (−S to S) calculated from an image of the N−1 frame.

First, at the N frame (image frame N), processing to stop calculation processing of correlation data Defs (X, Y) of the second correlation calculation part 604 at the N+1 frame will be explained referring to FIG. 11A. A digital image signal of the N frame is input, in order from a top line, to the DSP 109 from the DFE 108. Then, both the addition data N (X, Y) and the image data R (X, Y) are input to the DSP 109.

The second correlation calculation part 604 starts the correlation calculation processing at a timing where the addition data N (0, 0) and the image data R (0, 0) are input. In the correlation calculation processing, the Defs (X, Y) is calculated according to the above method. And, the second correlation calculation part 604 outputs correlation calculation data Defs (X, Y) in a distance map region in order from correlation data Defs (0, 0) after a correlation calculation processing time t, and ends the correlation calculation processing at a timing where correlation data Defs (6, 4) is output.

The first correlation calculation part 602 starts the correlation calculation processing at a timing where the addition data N (1, 1) and the image data R (1, 1) are input. In the correlation calculation processing, the Afd (X, Y) is calculated according to the above method. And, the first correlation calculation part 602 outputs correlation calculation data Afd (X, Y) in a focus detection region in order from correlation data Afd (1, 1) after a correlation calculation processing time t, and ends the correlation calculation processing at a timing where a correlation value of calculation data Afd (5, 3) in a focus detection region is output.

The control part 600 starts storage of correlation data Afd (X, Y) to the RAM 112 at a timing where the first correlation calculation part 602 inputs correlation data Afd (1, 1).

And the control part 600 starts a comparison operation between the N−1 frame and the N frame relative to correlation data Afd (X, Y) after the addition data N (6, 4) and the image data R (6, 4), which are the last data of the N−1 frame, are input to the DSP 109. The control part 600, in the comparison operation, determines whether or not an absolute value of differences between correlation data Afd (X, Y) of the preceding N−1 frame and the N frame is larger than a threshold value set by the CPU 114.

When checking that all comparison data Comp (X, Y) are larger than the threshold value, the control part 600 performs a selection operation Sel for next frame processing. In the selection operation Sel, flames used for the comparison operation are set to the N frame and the N+1 frame, and a region to store correlation data Afd (X, Y) of the N+1 frame is reserved in the RAM 112.

The control part 600 performs a STOP operation to stop the correlation processing of correlation data Defs (X, Y) by the second correlation calculation part 604 at a timing where the N frame ends.

Next, processing of the DSP 109 during stopping the correlation calculation processing by the second correlation calculation part 604 at the N+1 frame will be explained referring to FIG. 11B. The explanation of the same processing as the N frame is omitted.

The control part 600 starts storage of correlation data Afd (X, Y) to the RAM 112 at the N+1 frame at a timing where correlation data Afd (1, 1) is input by the first correlation calculation part 602. And the control part 600 stars a comparison operation between the N frame and the N+1 frame relative to correlation data Afd (X, Y) after the addition data N (6, 4) and the image data R (6, 4), which are the last data of the N+1 frame, are input to the DSP 109.

After completing the comparison operation, the control part 600 performs the selection operation Sel for next frame processing. In the selection operation Sel, flames used for the comparison operation are set to the N+1 frame and the N+2 frame, and a region to store correlation data Afd (X, Y) of the N+2 frame is reserved in the RAM 112.

Next, processing by the DSP 109 while the calculation performing of correlation data Defs (X, Y) by the second correlation calculation part 604 is restored from a stop state at the N+2 frame referring to FIG. 11C. The explanation of the same processing as the N frame is omitted.

The control part 600 starts storage of correlation data Afd (X, Y) to the RAM 112 at the N+2 frame at a timing where correlation data Afd (1, 1) is input by the first correlation calculation part 602. And the control part 600 stars a comparison operation between the N+1 frame and the N+2 frame relative to correlation data Afd (1, 1) after the addition data N (6, 4) and the image data R (6, 4), which are the last data of the N+2 frame, are input.

After completing the comparison operation, the control part 600 performs the selection operation Sel for next frame processing. Comparison data Comp (4, 2) exceeds the threshold value at the N+2 frame according to this embodiment.

In the selection operation Sel, flames used for the comparison operation are set to the N+2 frame and the N+3 frame, and a region to store correlation data Afd (X, Y) of the N+3 frame is reserved in the RAM 112.

The control part 600 performs an Exe operation to execute calculation processing of correlation data Defs (X, Y) by the second correlation calculation part 604 at a timing where the N+2 frame ends.

Thus, determining whether or not a distance map is calculated at next frame according to image data and decreasing calculation operation with less importance reduce a load of the calculation circuit. When a defocus amount and comparison data respectively are larger than a threshold value in all focus detection region, calculation of distance map is stopped at next frame. However, when they exceed the threshold value in apart of focus detection region, calculation of distance map corresponding to next frame may be stopped.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-026989, filed on Feb. 13, 2015, which is hereby incorporated by reference wherein in its entirety.

What is claimed is:

1. A control apparatus for controlling an image pickup apparatus including an image sensor that has a plurality of pixel portions respectively having a plurality of photoelectric conversion portions and outputs an image signal from the photoelectric conversion portions, the control apparatus comprising:
   one or more processors; and
   at least one memory coupled to the one or more processors, the at least one memory having instructions stored thereon which, when executed by the one or more processors, cause the control apparatus to:
   calculate a first correlation information between image signals, which are respectively output from one of the pixel portions positioned in one of a plurality of first regions;
   perform focus detection on the basis of a result of the calculating of the first correlation information;
   calculate second correlation information between image signals, which are respectively output from the one of the pixel portions positioned in one of a plurality of second regions, wherein the one of the second regions includes a region near the one of the first regions, is larger than the one of the first regions, and corresponds to the one of the first regions;
   calculate distribution information corresponding to an object distance on the basis of a result of the calculating of the second correlation information; and
   control the calculating of the second correlation information and the calculating of the distribution information on the basis of the calculated first correlation information.

2. The control apparatus according to claim 1, wherein the calculating of the second correlation information is based on an image signal output from one of the pixel portions positioned in the one of the second regions corresponding to the one of the first regions, in which the first correlation information varies.

3. The control apparatus according to claim 2, wherein variation of the first correlation information is detected on the basis of comparison between present first correlation information and past first correlation information, which are calculated using an image signal output from one of the pixel portions positioned in the one of the first regions.

4. The control apparatus according to claim 3, wherein the the calculating of the second correlation information using an image signal output from one of the pixel portions positioned in the one of the second regions is performed when an absolute value of differences between the present first correlation information and the past first correlation information, which are calculated using an image signal output from one of the pixel portions positioned in the one of the first regions, is larger than a threshold value.

5. The control apparatus according to claim 4, wherein the calculating of the second correlation information using an image signal output from one of the pixel portions positioned in the one of the second regions is performed when an absolute value of the differences based on image signals output from the pixel portions positioned in the first regions is larger than a threshold value.

6. The control apparatus according to claim 1, wherein the calculating of the second correlation information using an image signal output from one of the pixel portions positioned in the one of the second regions is performed when the first correlation information, which is calculated using an image signal output from one of the pixel portions positioned in the one of the first regions, indicates correlation lower than a reference.

7. The control apparatus according to claim 6, wherein the calculating of the second correlation information using an image signal output from one of the pixel portions positioned in the one of the second regions is performed when the first correlation information, which is based on image signals output from the pixel portions positioned in the first regions, indicates correlation lower than a reference.

8. The control apparatus according to claim 1, wherein the distribution information is information indicating distribution of an image shift amount between image signals that respectively obtained from the photoelectric conversion portions of the one of the pixel portions.

9. The control apparatus according to claim 1, wherein the distribution information is information indicating distribution of a defocus amount between image signals that respectively obtained from the photoelectric conversion portions of the one of the pixel portions.

10. The control apparatus according to claim 1, wherein the distribution information is information indicating distribution of an object distance based on an image shift amount between image signals that respectively obtained from the photoelectric conversion portions of the one of the pixel portions.

11. The control apparatus according to claim 1, wherein the instructions, when executed by the one or more processors, further cause the communication apparatus to:
   during setting a shooting mode, generate the distribution information based on the image signal obtained by the image sensor, using a signal output from the pixel portions positioned in the first regions.

12. An image pickup apparatus comprising:
   an image sensor that has a plurality of pixel portions respectively including a plurality of photoelectric conversion portions and outputs an image signal from the photoelectric conversion portions;
   a control apparatus including:
      one or more processors, and
      at least one memory coupled to the one or more processors, the at least one memory having instructions stored thereon which, when executed by the one or more processors, cause the control apparatus to:
      calculate a first correlation information between image signals, which are respectively output from one of the pixel portions positioned in one of a plurality of first regions,
      perform focus detection on the basis of a result of the calculating of the first correlation information,
      calculate second correlation information between image signals, which are respectively output from the one of the pixel portions positioned in one of a plurality of second regions, wherein the one of the second regions includes a region near the one of the first regions, is larger than the one of the first regions, and corresponds to the one of the first regions, calculate distribution information corresponding to an object distance on the basis of a result of the calculating of the second correlation information, control the calculating of the second correlation information and the calculating of the distribution information on the basis of the calculated first correlation information, and calculate the object distance on the basis of the calculated second correlation information.

13. A control method of a control apparatus used for an image pickup apparatus including an image sensor that has a plurality of pixel portions respectively including a plurality of photoelectric conversion portions and outputs an image signal from the photoelectric conversion portions, the control method comprising:

calculating first correlation information between image signals, which are respectively output from one of the pixel portions positioned in one of a plurality of first regions;

performing focus detection on the basis of a result of the calculating of the first correlation information;

calculating second correlation information between image signals, which are respectively output from the one of the pixel portions positioned in one of a plurality of second regions, wherein the one of the second regions includes a region near the one of the first regions, is larger than the one of the first regions, and corresponds to the one of the first regions;

calculating distribution information corresponding to an object distance on the basis of a result of the calculating of the second correlation information; and controlling the calculating of the second correlation information and the calculating of the distribution information on the basis of the calculated first correlation information.

14. A non-transitory computer-readable medium configured to store a control method of a control apparatus used for an image pickup apparatus including an image sensor that has a plurality of pixel portions respectively including a plurality of photoelectric conversion portions and outputs an image signal from the photoelectric conversion portions, the control method comprising:

calculating first correlation information between image signals, which are respectively output from one of the pixel portions positioned in one of a plurality of first regions;

performing focus detection on the basis of a result of the calculating of the first correlation information;

calculating second correlation information between image signals, which are respectively output from the one of the pixel portions positioned in one of a plurality of second regions, wherein the one of the second regions includes a region near the one of the first regions, is larger than the one of the first regions, and corresponds to the one of the first regions;

calculating distribution information corresponding to an object distance on the basis of a result of the calculating of the second correlation information; and controlling the calculating of the second correlation information and the calculating of the distribution information on the basis of the calculated first correlation information.

* * * * *